United States Patent
Tomasi et al.

(10) Patent No.: US 12,226,863 B2
(45) Date of Patent: Feb. 18, 2025

(54) SYSTEM AND A METHOD FOR LOCATING A WORKPIECE-HOLDER FRAME IN POSITION IN A PROCESSING OR ASSEMBLING STATION OF A PRODUCTION PLANT

(71) Applicant: Comau S.p.A., Grugliasco (IT)

(72) Inventors: Daniele Tomasi, Grugliasco (IT);
Daniele Ruffino, Grugliasco (IT);
Tiziano Bertolo, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 8 days.

(21) Appl. No.: 18/283,146

(22) PCT Filed: Mar. 30, 2022

(86) PCT No.: PCT/IB2022/052923
§ 371 (c)(1),
(2) Date: Sep. 20, 2023

(87) PCT Pub. No.: WO2022/208372
PCT Pub. Date: Oct. 6, 2022

(65) Prior Publication Data
US 2024/0165754 A1    May 23, 2024

(30) Foreign Application Priority Data

Apr. 1, 2021   (IT) .................. 102021000008147

(51) Int. Cl.
*B23P 21/00*      (2006.01)
*B62D 65/18*      (2006.01)

(52) U.S. Cl.
CPC ............ *B23P 21/004* (2013.01); *B62D 65/18* (2013.01); *B23P 2700/50* (2013.01)

(58) Field of Classification Search
CPC .... B23P 21/004; B23P 2700/50; B62D 65/18; B62D 65/022; B23Q 7/1442
See application file for complete search history.

(56) References Cited

U.S. PATENT DOCUMENTS 8,474,682 B2   7/2013   Kilibarda
8,839,507 B2   9/2014   Kilibarda et al.

FOREIGN PATENT DOCUMENTS

| EP | 2 123 390 | A1 | 11/2009 |
| WO | 86/03179 | A1 | 6/1986 |
| WO | 2019/202569 | A1 | 10/2019 |
| WO | 2022/208335 | A1 | 10/2022 |

*Primary Examiner* — Moshe Wilensky
(74) *Attorney, Agent, or Firm* — Young Basile Hanlon & MacFarlane, P.C.

(57) ABSTRACT

A system for locating a workpiece-holder frame and workpiece in a workpiece processing station. The system includes stationary support structures arranged on two sides of a working area in the workpiece processing station. The stationary support structures include vertically movable support members configured to engage and lift the workpiece-holder frame from a carriage and position the workpiece in a predetermined X, Y and Z coordinate position for processing of the workpiece. The stationary support structures lower and disengage the workpiece-holder frame which is removed from the working area for further processing of the workpiece.

12 Claims, 14 Drawing Sheets

SYSTEM AND A METHOD FOR LOCATING A WORKPIECE-HOLDER FRAME IN POSITION IN A PROCESSING OR ASSEMBLING STATION OF A PRODUCTION PLANT

CROSS-REFERENCE TO RELATED APPLICATION(S)

This application is filed pursuant to 35 U.S.C. § 371 claiming priority benefit to PCT/IB2022/052923 filed Mar. 30, 2022, which claims priority benefit to Italian Patent Application No. 102021000008147 filed Apr. 1, 2021, the contents of both applications are incorporated herein by reference in the entirety for all purposes.

TECHNICAL FIELD

The present invention relates to systems and methods for locating a workpiece-holder frame in position in a processing or assembling station of a production plant.

BACKGROUND

In processing or assembling stations of the type indicated above, it is often necessary to make it possible to carry out operations both in automatic and manual mode, with the intervention of operators who must be able to work in ergonomic conditions and in full safety. This requirement often makes it difficult to use systems for moving the workpiece and locating it in position in the processing station which reduce or even prevent accessibility from all sides of the workpiece being processed. On the contrary, in applications of the type indicated above it is essential to reduce as much as possible the distance between the parts on which it is necessary to work, and the areas that can be walked on by the operators. It is also necessary that the equipment provided to support and locate the workpiece in position does not create obstacles for the operators. At the same time, when a processing station has to operate in fully automatic mode, it is—in any case—necessary that the step of locating the workpiece in position in the processing station is performed extremely precisely and, nevertheless, in a relatively short time.

Another need that occurs in applications of the type described above is to be able to easily and quickly adapt the processing station to each new application or product model, thanks to the use of flexible handling systems.

As indicated, conventional handling systems, such as ground conveyors, "lift and move" systems or motorized roller beds, involve the use of fixed floor structures that prevent the operator from reaching the parts to be processed from all directions. Other systems, such as overhead conveyors, leave the floor space free, but—in any case—involve the use of support frames that hinder access to the workpiece, and are also expensive.

Finally, many known conventional solutions have the drawback of not being able to flexibly adapt to the introduction of new models in production, or to changes in the layout of the plant and in the path of the production line.

Production systems are also known wherein the manual operations and the automatic operations are performed in separate stations, with the consequent drawback of having to provide transfer systems to transport the workpiece from an automatic station to a manual station, or on the contrary from a manual station to an automatic station, which involves introducing activities without added value and the use of additional equipment, with relative costs.

SUMMARY

The object of the present invention is to resolve the aforesaid drawbacks.

In particular, one object of the invention is to provide a system and a method for positioning a workpiece-holder frame in a processing or assembling station, which can be used for stations that can operate both in fully automatic and in manual mode, ensuring accessibility for operators from all sides to the workpiece.

Another object of the invention is to provide a system and a method of the type specified above, which allows locating in position of the workpiece in the processing station in an extremely precise manner and in an extremely reduced time.

Another object of the invention is to provide a system and a method of the type indicated above which have high flexibility characteristics, in terms of easy adaptability to a new application and/or to the introduction of a new product into production and/or changes in the layout of the production plant and/or in the path of the production line.

Yet another object of the invention is to provide a system and a method of the type indicated above that can be implemented with simple and low-cost means.

With a view to achieving one or more of the aforesaid objects, the object of the invention is a system for locating a workpiece-holder frame in position in a processing or assembling station of a production plant, comprising:

a processing or assembling station, having a working area and stationary support structures on both sides of the working area, a carriage, configured to carry a workpiece-holder frame along a line inside the working area, a workpiece-holder frame carried on the carriage, configured to carry a workpiece in a predetermined position with respect to the workpiece-holder frame, wherein said stationary support structures, arranged on the two sides of the working area, carry vertically-movable support members, positioned and configured to engage and lift the workpiece-holder frame carried by a carriage stationary in the working area, so as to move the workpiece-holder frame away from the carriage and vertically position the workpiece-holder frame at a predetermined vertical height (z), wherein said vertically-movable support members include at least three ball supports, spaced apart from each other, two of which are arranged on opposite sides of the working area, and each including a ball that is freely rotatable in any direction around its center, wherein the workpiece-holder frame has a plurality of flat lower engagement surfaces, positioned and configured to be respectively engaged by said ball supports, in such a way that when the workpiece-holder frame is raised to said aforesaid vertical height (z), the workpiece-holder frame can float in any horizontal direction above the freely rotatable balls of said ball supports, and wherein with at least two of said stationary support structures there are also associated respective auxiliary centering members, vertically movable and spaced apart from each other, which are configured to cooperate with engagement elements projecting downwardly from the workpiece-holder frame, in such a way as to position the frame workpiece holder along two horizontal directions (X, Y) orthogonal to each other, said system also comprising:

actuator devices, which control the movement of said ball supports and of said auxiliary centering members independently of each other, and an electronic controller programmed to control the aforesaid actuator devices in such a way that when the carriage has brought a workpiece-holder frame into the working area, the ball supports are raised, engaging the workpiece-holder frame and lifting it up to the required vertical height (Z), while the auxiliary centering members are simultaneously lifted, in such a way as to only partially engage the cooperating engagement elements when the workpiece-holder frame reaches the required vertical height (Z), said auxiliary centering members then continuing their upward movement, until they completely engage the corresponding engagement elements of the workpiece-holder frame, so as to center the frame in the two aforesaid horizontal directions (X, Y) and with a predetermined orientation with respect to rotations in the horizontal plane, exploiting the possibility of the workpiece-holder frame to float in any horizontal direction above the freely rotatable spheres of said ball supports, until the auxiliary centering members have reached their vertical position of complete engagement of the corresponding engagement elements.

The invention also relates to the method implemented by means of the system described above.

Further characteristics and advantages of the invention are indicated in the dependent claims.

BRIEF DESCRIPTION OF THE DRAWINGS

An embodiment of the invention will now be described with reference to the attached drawings, provided purely by way of non-limiting example, wherein.

DETAILED DESCRIPTION

In the present description, and in the claims that follow, the term "workpiece" is used in a generic sense, to indicate any piece, structure, subassembly of a structure, component or group of components that must be subjected to processing and/or assembling operations in a station of a production plant. For example, the present invention is applicable to a station for assembling the battery pack for powering electric traction motors of electric vehicles. However, the invention is also equally applicable in other fields, for example, to the field of assembling stations for motor-vehicle bodies or their sub-assemblies.

Figure 1:
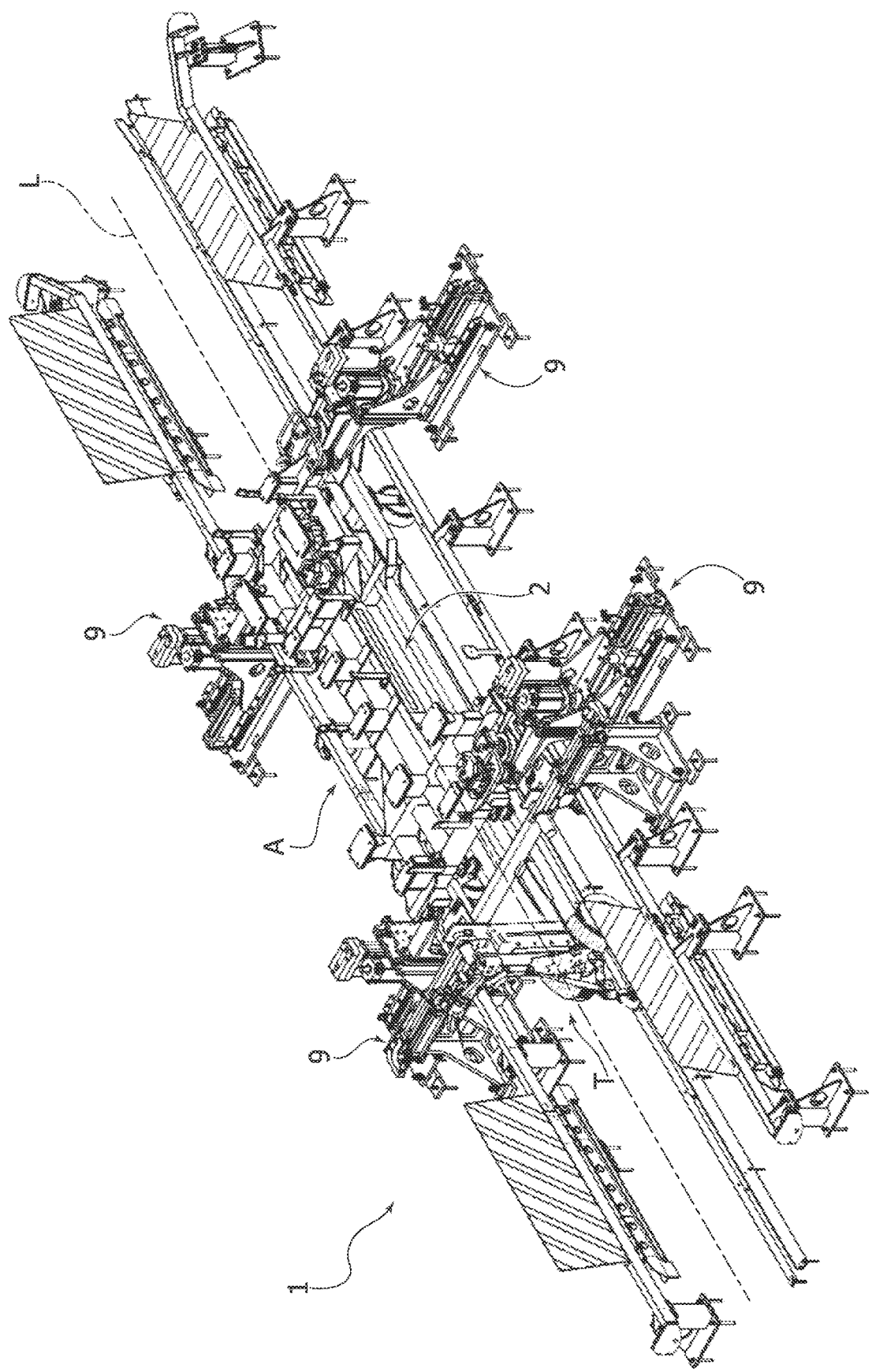
FIG. 1 is a perspective view of a processing station using the system according to the invention.
Figure 2:
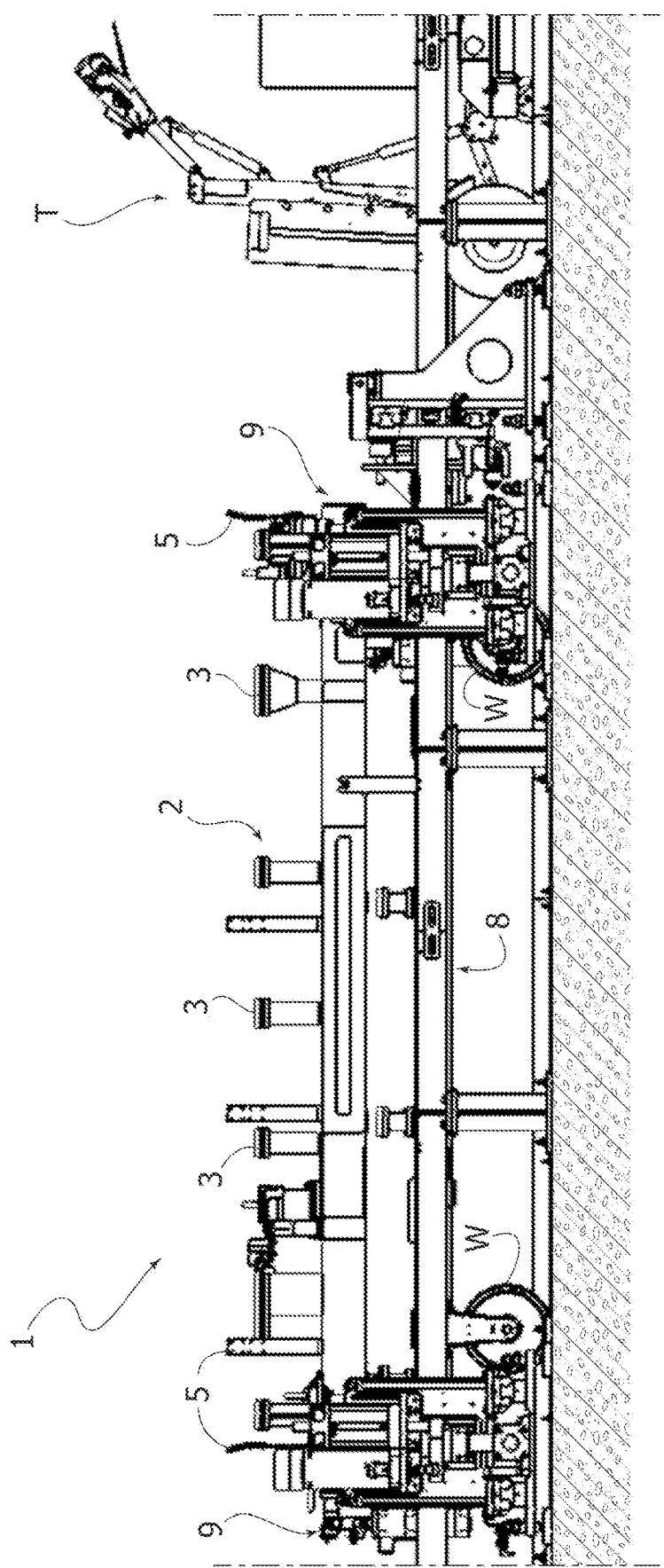
FIG. 2 is a side view on an enlarged scale of a detail of FIG. 1.

In FIG. 1, numeral 1 indicates—in its entirety—a system for moving and positioning a workpiece-holder frame 2 in a working area A of a processing or assembling station.

As indicated above, in the present description, and in the claims that follow, the term "workpiece" is used in a wide sense, to indicate any piece, structure, subassembly of a structure, component or group of components intended to be subjected to processing and/or assembling operations in a station of a processing plant. The attached drawings do not show the workpiece or component carried by the workpiece-holder frame 2, nor do they illustrate the automatic or manual equipment intended for operating on the workpiece. These aspects fall outside the scope of the present invention, which instead refers specifically to the system for moving the workpiece-holder frame and for locating it into position in the working area A. In the specific case of the illustrated example, the system according to the invention has been designed for application to a processing station for assembling battery packs for powering electric traction motors of electric vehicles. The system would equally apply, however, to any other type of products and operations, including assembling operations of motor-vehicle structures or their subassemblies.

As already indicated, the system according to the invention lends itself to being used in a particularly advantageous way on processing or assembling stations capable of operating both in a completely automatic mode and in an (at least partially) manual mode, and is characterized in that it makes the workpiece located in the working area easily accessible from all its sides for the operators who have to intervene in the working area.

Figure 5:
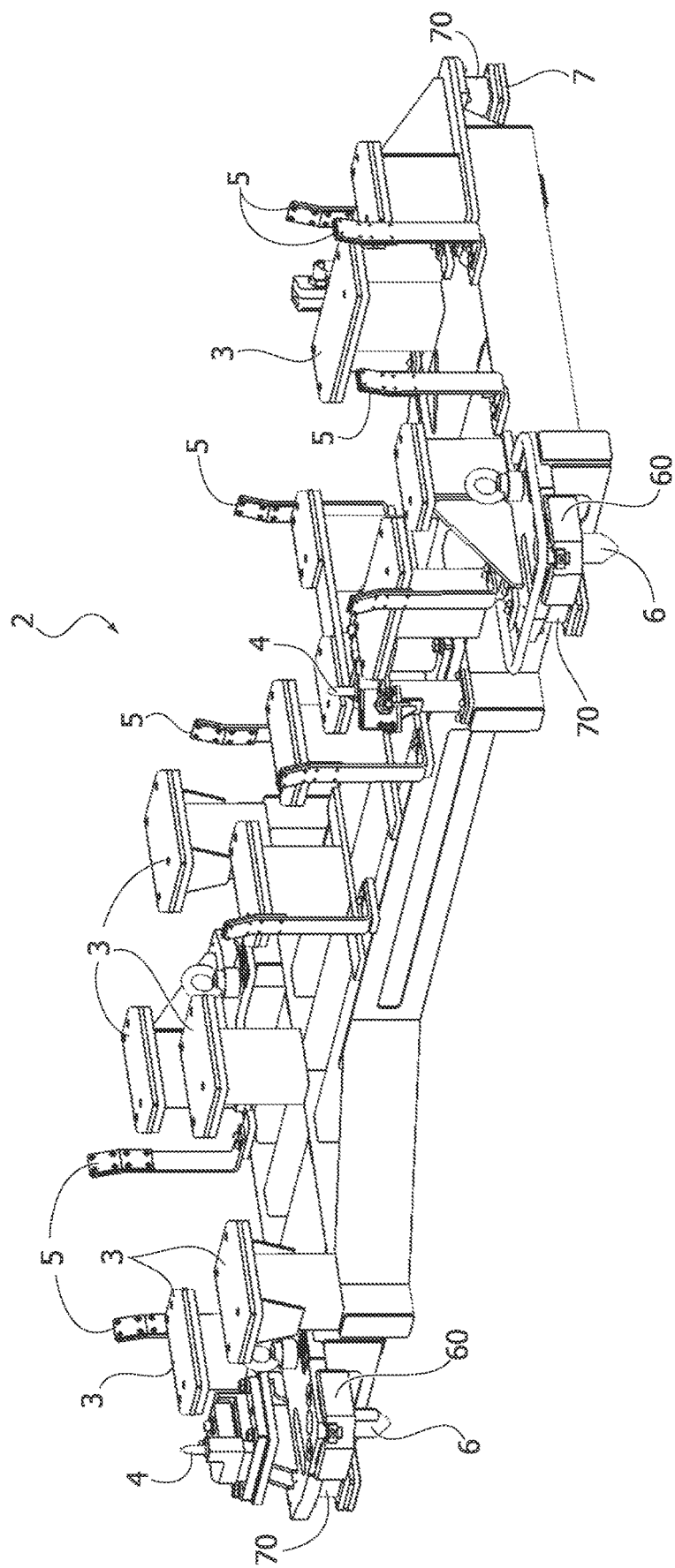
FIG. 5 is a perspective view of an example of a workpiece-holder frame used in the system according to the invention.
Figure 6:
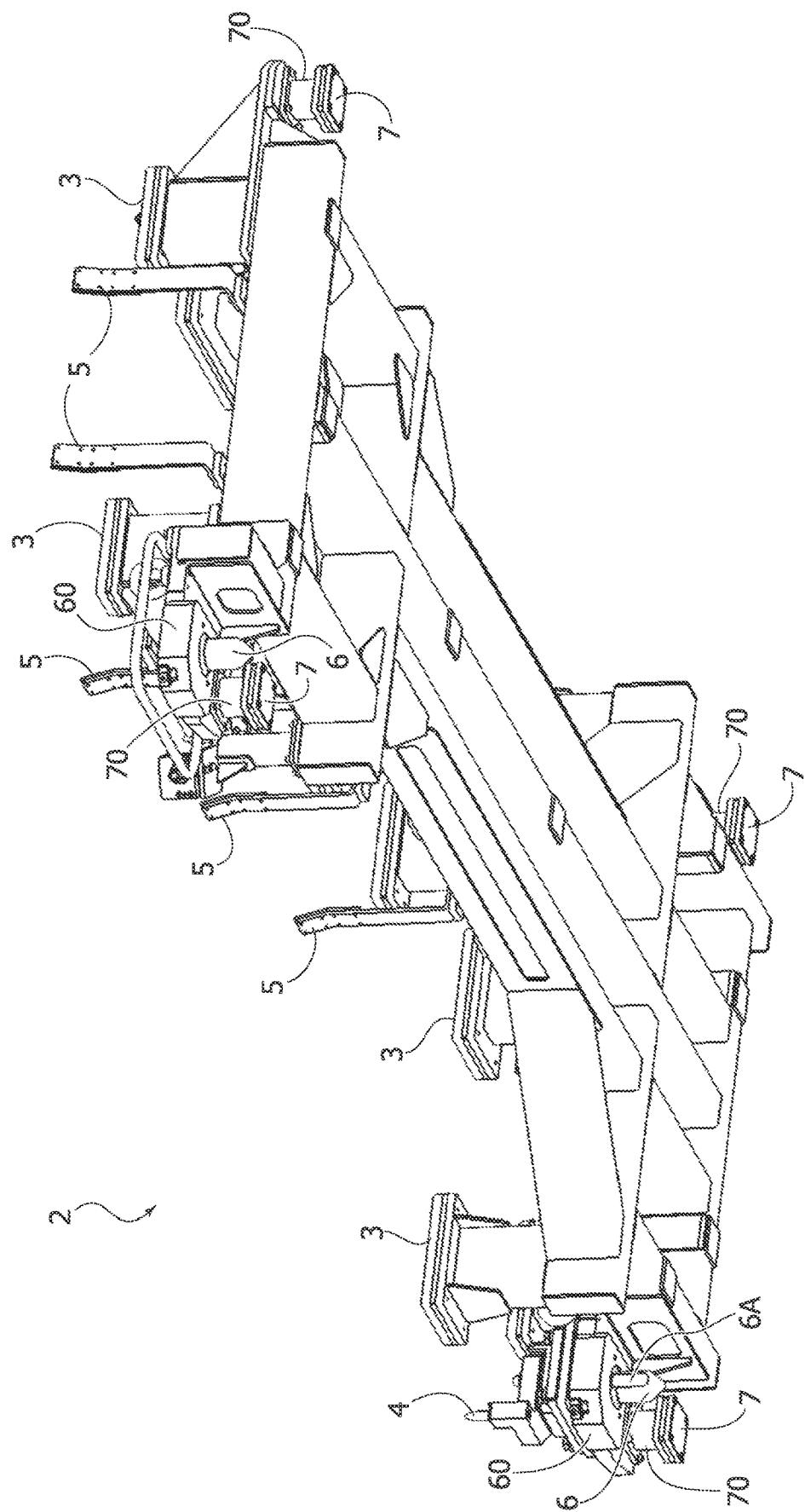
FIG. 6 is a perspective view from below of the workpiece-holder frame of FIG. 5.

FIGS. 5 and 6 of the attached drawings show two perspective views of an example of a workpiece-holder frame 2 usable in the system according to the invention. In the case of this example, the frame 2 has a structure consisting of metal elements, for example, welded and/or bolted together, and includes a plurality of upper support surfaces 3, positioning pins 4 and positioning brackets 5 to support and locate the workpiece, component or assembly in a precise position with respect to the workpiece-holder frame 2. The workpiece-holder frame 2 further comprises two engagement elements 6 in the form of pins with conical tips projecting downwards from side supports 60 of the workpiece-holder frame 2, which are spaced apart in the longitudinal direction of the frame and adjacent to a front end and at a rear end of the workpiece-holder frame 2, respectively, on the same side thereof. The function of the engagement pins 6 will become clear below.

Still with reference to the illustrated example, the workpiece-holder frame 2 also has four supports 70 projecting downwards from the frame 2, and defining lower engagement surfaces 7 (FIG. 6) whose function will also become clear below. In the case of the illustrated example, two supports 70 are provided on the two sides of one end of the workpiece-holder frame 2, and two supports 70 on the two sides of the opposite end of the workpiece-holder frame 2.

Figure 3:
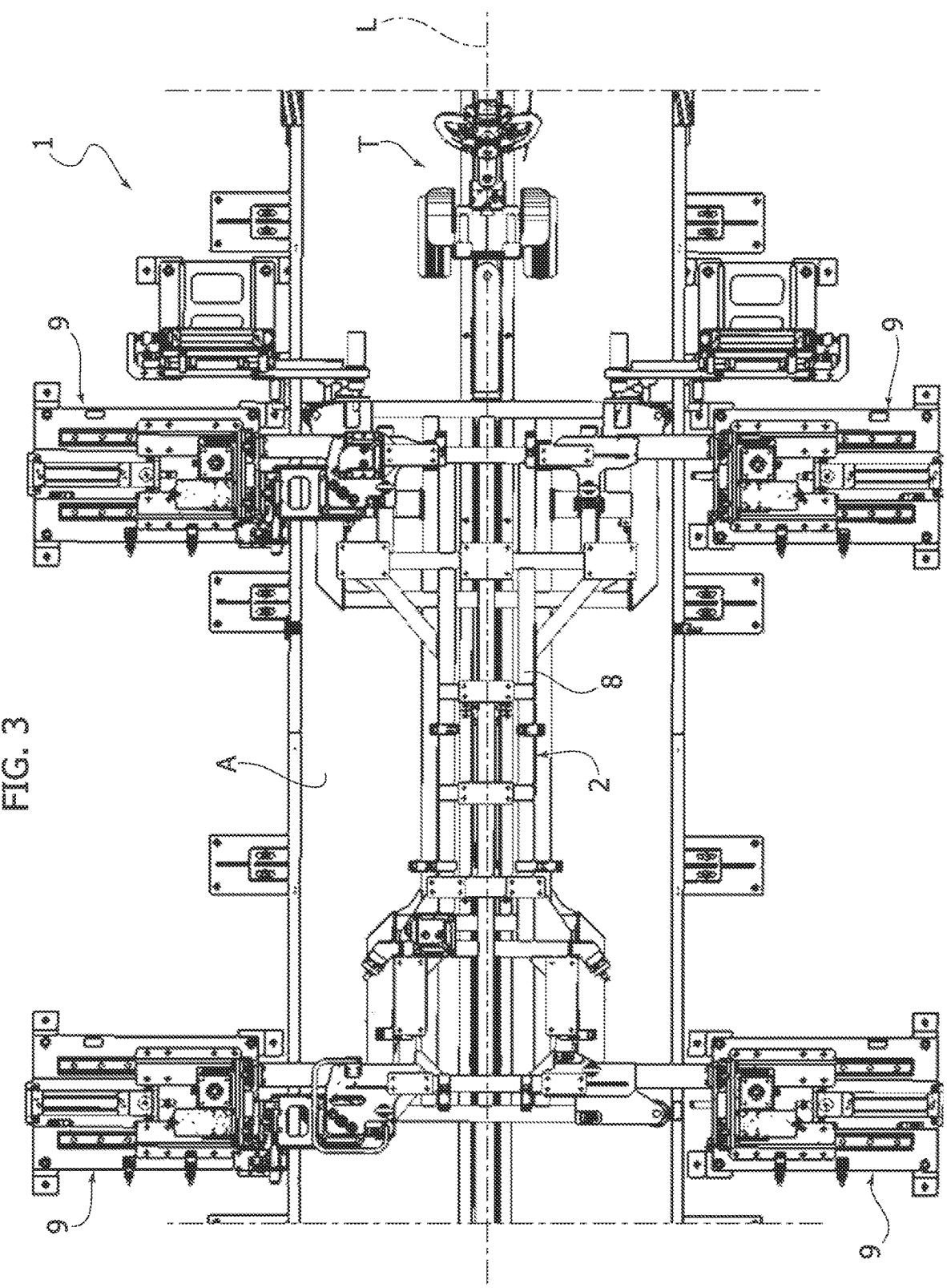
FIG. 3 is a plan view on an enlarged scale of a detail of FIG. 1.
Figure 4:
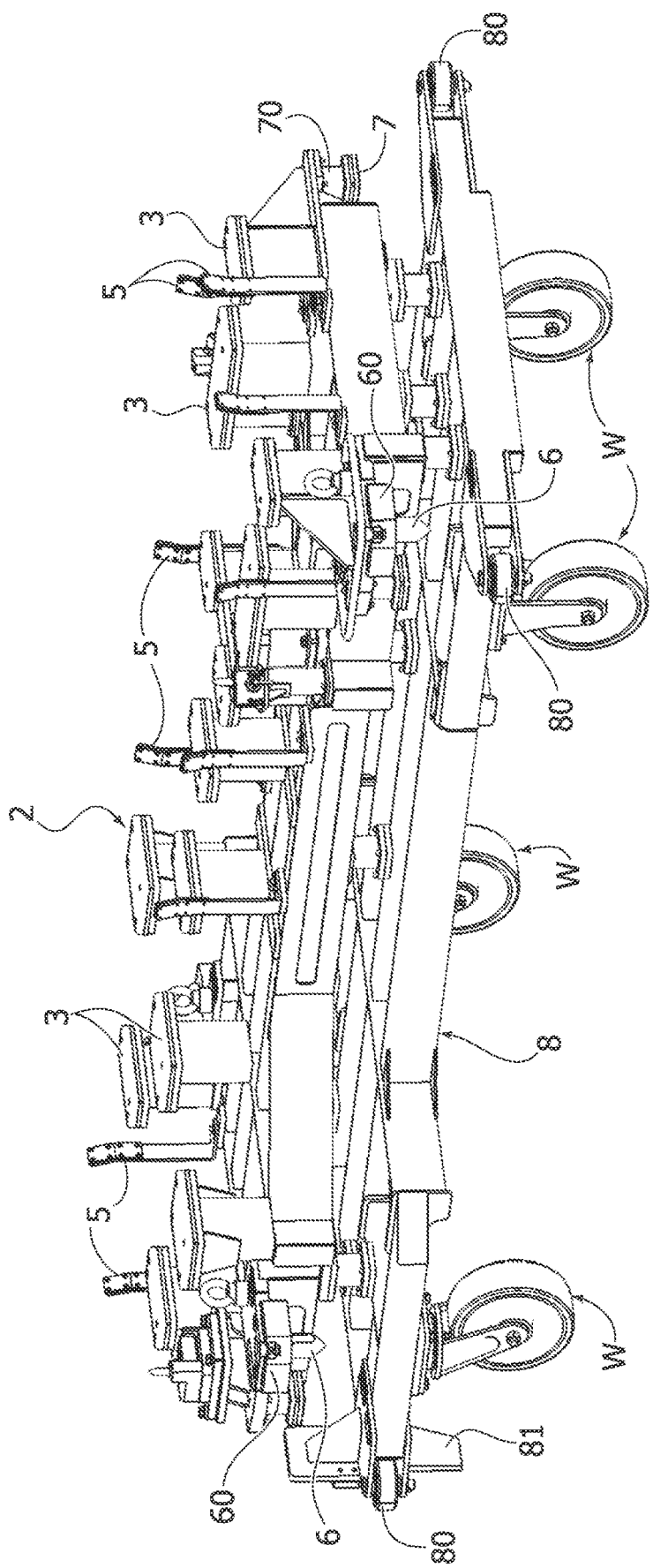
FIG. 4 is a perspective view of a carriage used in the system according to the invention, with a workpiece-holder frame carried above the carriage.

In the illustrated embodiment example (FIGS. 1 and 3), the workpiece-holder frame 2 is transported along a line L through the working area A by means of a carriage 8, which is illustrated in FIG. 4 with the workpiece-holder frame 2 carried above it. The carriage 8 and the workpiece-holder frame 2 are configured in such a way that the engagement pins 6 and the flat engagement surfaces 7 of the workpiece-holder frame 2 (FIG. 6) are—in any case—accessible from below, even when the workpiece-holder frame 2 is arranged above the carriage 8. The carriage 8 may be moved along the line L in one direction or the other, depending on the needs of each specific application.

In the case of the illustrated example, the carriage 8 is a simple manually-operated carriage including a frame 80 mounted on wheels W (in the example shown the front wheels are pivoting and the rear ones have a fixed axis). Again in the case of the illustrated example, the carriage 8 is intended to be moved by means of a small tractor T with manual or motor-assisted operation, which is driven by an operator who pulls it or pushes it along the line L. The operator moves the carriage 8 until it is brought into the working area A, where the system according to the invention lifts (in the manner described below) the workpiece-holder frame 2 away from the carriage 8 and locates it to a precise position both in a vertical direction Z, and along two horizontal directions X, Y orthogonal to each other, and with respect to rotations in the horizontal plane. Once the operations (manual and/or automatic) in the working area on the workpiece thus located in position have been carried out, the system according to the invention lowers the workpiece-holder frame 2, with the workpiece carried above it, above the carriage 8, after which the operator moves the carriage along the line L taking it out of the working area, towards the subsequent stations of the plant.

Of course, the manually-operated carriage that is illustrated in the attached drawings could be replaced by any other type of manually-operated or motorized carriage, and in particular it could be replaced by an AGV (Automated Guided Vehicle) or AMR (Automated Mobile Robot).

In order to lift the workpiece-holder frame 2 when the carriage 8 is in the working area A, the system according to the invention comprises a plurality of stationary structures (in the example, four) 9 arranged at the two sides of the working area A (FIGS. 1, 3). The stationary structures 9, in the case of the example described here, are of the type illustrated in FIG. 7, or of the type illustrated in FIG. 9. In both cases, each stationary structure 9 is equipped with a vertically-movable ball support 10 positioned and configured to engage and lift the workpiece-holder frame 2 carried by the carriage 8 stationary in the working area. Each ball support 10 may be of any type known per se, including a casing 11 from which a ball 12 (e.g., a metal sphere) protrudes above, supported within the casing 11 in a freely rotatable way in any direction around the center of the ball 12.

Figure 7:
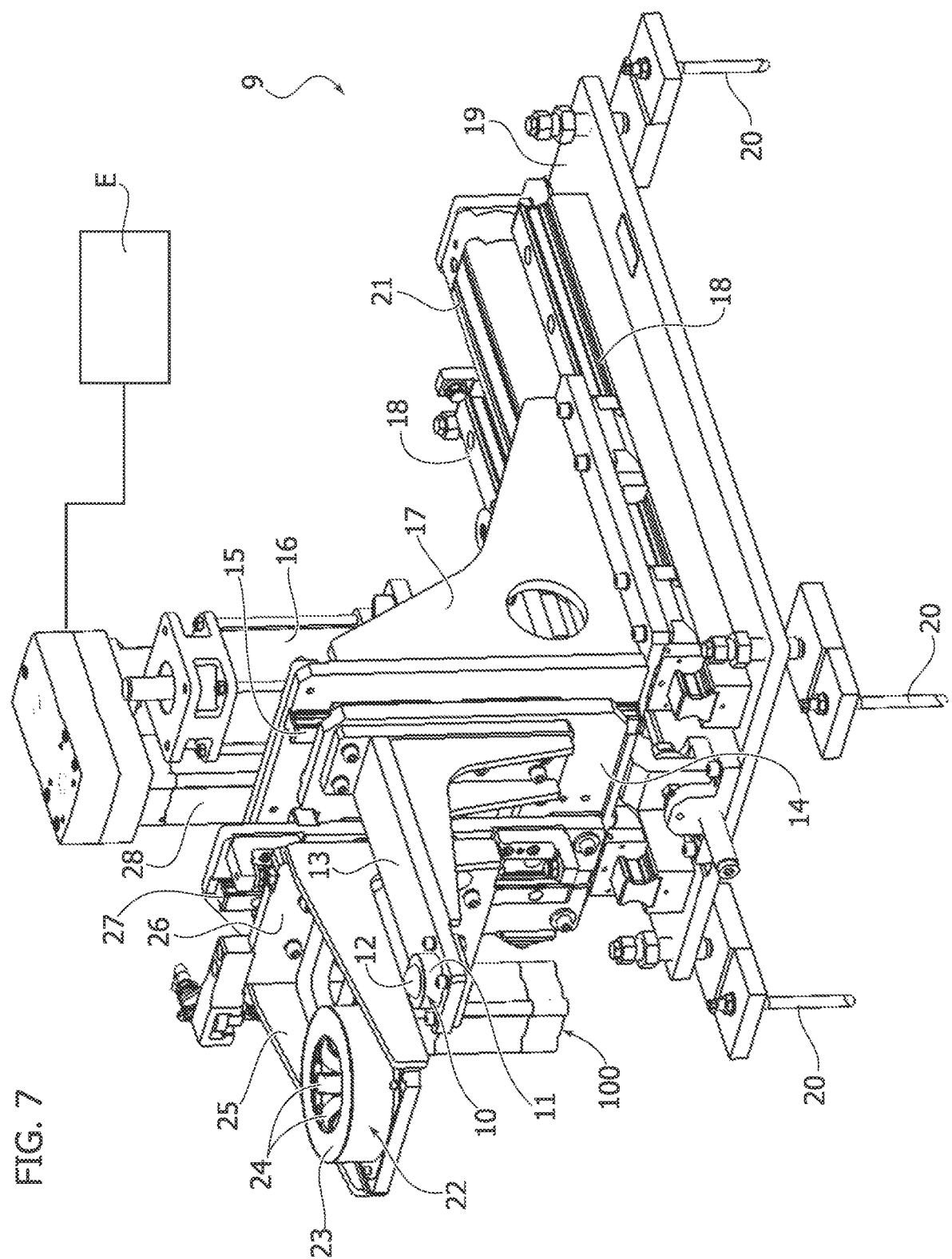
FIG. 7 is a perspective view of a stationary support unit arranged on one side of the working area of the station of FIG. 1, provided with a ball support member and an auxiliary centering member, vertically-movable independently from each other.
Figure 9:
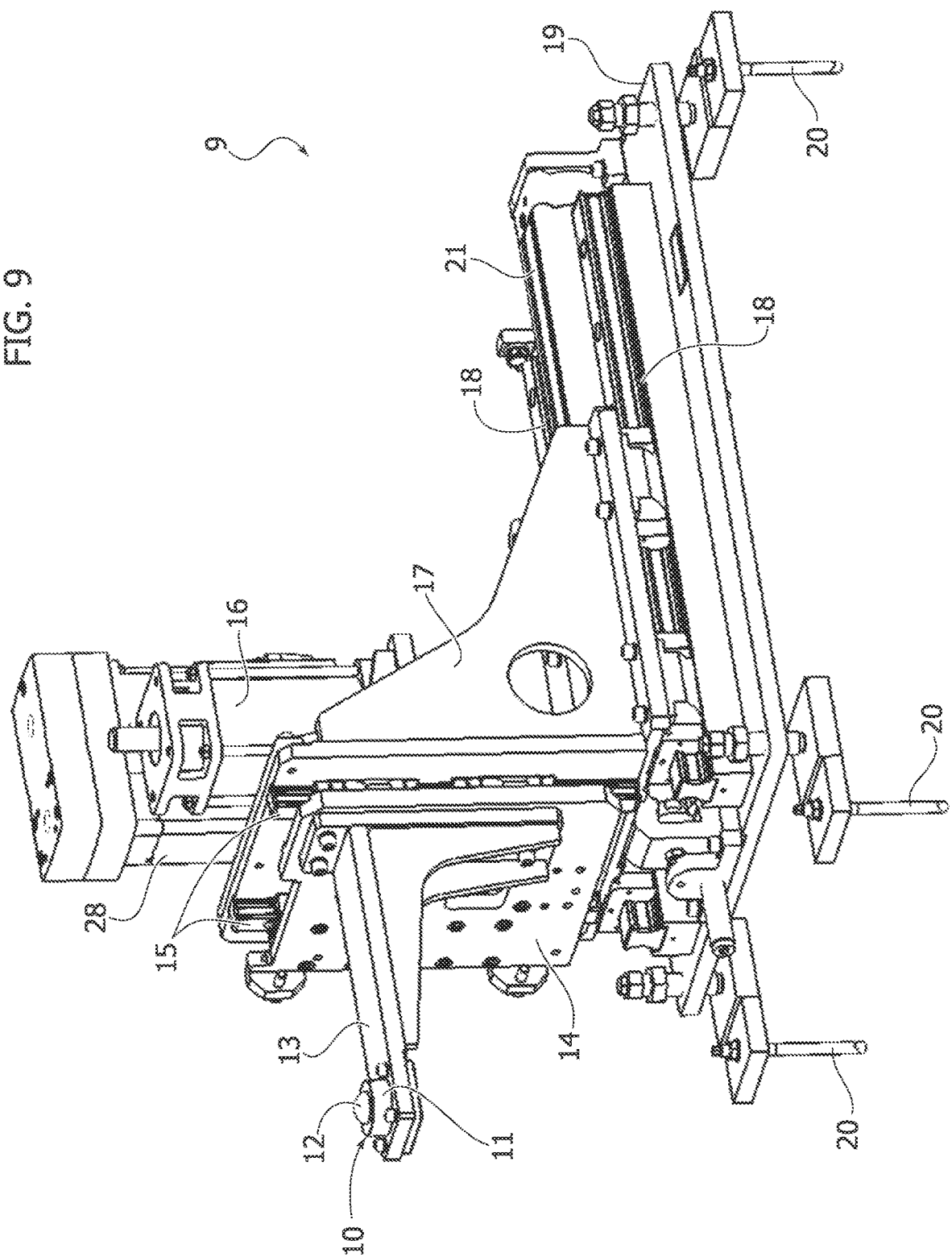
FIG. 9 is a perspective view of another stationary unit arranged on one side of the working area of the station of FIG. 1, equipped with a vertically-movable ball support member.
Figure 12:
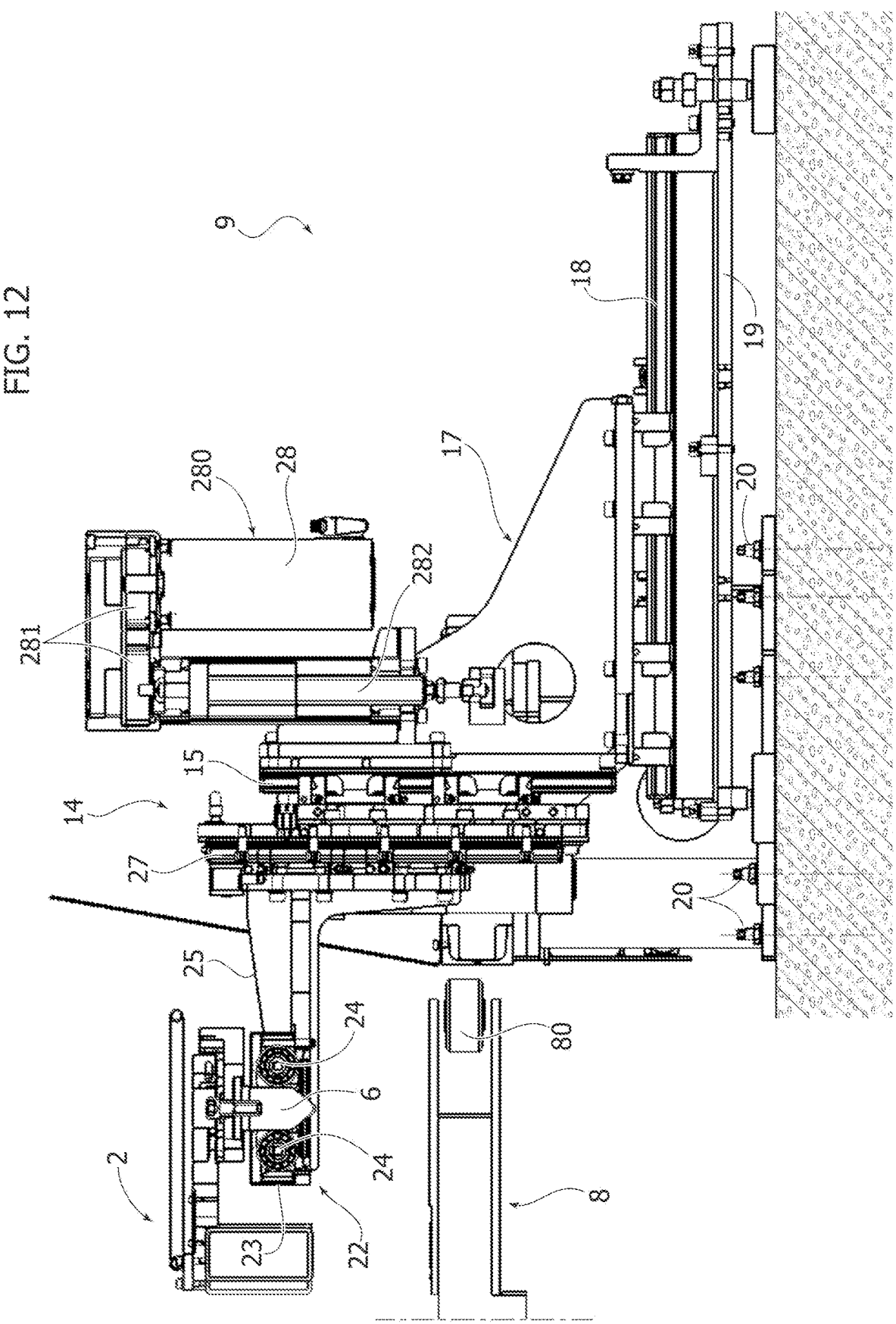
FIGS. 12, 13 are front views that illustrate stationary structures arranged on the sides of the working area with respective auxiliary centering members in the engagement condition on corresponding engagement elements carried by the workpiece-holder frame.
Figure 13:
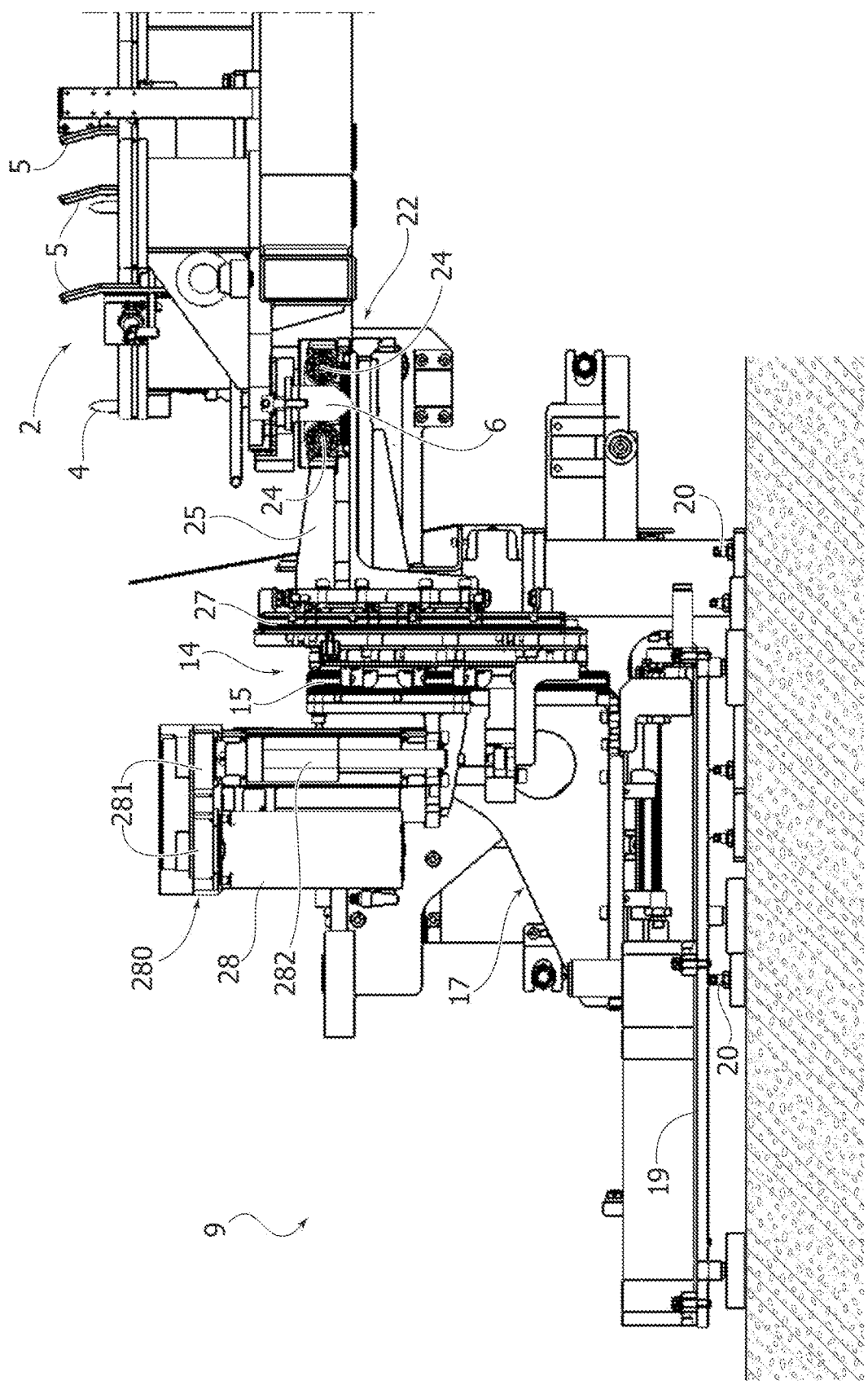

The construction details of the ball support 10 are not described or illustrated here, as they can be made in any known way and as they, taken alone, do not fall within the scope of the present invention. Both in the case of a stationary structure 9 of the type illustrated in FIG. 7 and in the case of a stationary structure 9 of the type illustrated in FIG. 9, the ball support 10 is mounted above a bracket 13 rigidly connected to, and projecting from, a slide 14 vertically-movable on one or more guides 15. The movement in the vertical direction of the slide 14 is controlled by an actuator or servo-controlled electric motor 28 by means of a mechanical transmission of any known type. In the example of application illustrated (see FIGS. 12 and 13) the transmission comprises a belt transmission 281 and a worm screw device 282. With reference to FIGS. 7 and 9, a pneumatic braking device 16 is also associated with the servo-controlled electric motor 28, which is activated when the electric motor is stationary in its working position.

In the case of the illustrated example, the guides 15 for the vertical movement of the slide 14 are carried by a slide support 17 (or slide 17) slidably mounted on horizontal guides 18, directed orthogonally to the longitudinal direction of the line L, which are mounted on a base plate 19 intended to be rigidly connected to the plant floor by means of chemical or mechanical anchors 20. The movement of the slide supports 17 along the guides 18 is driven by a pneumatic cylinder 21.

Figure 8:
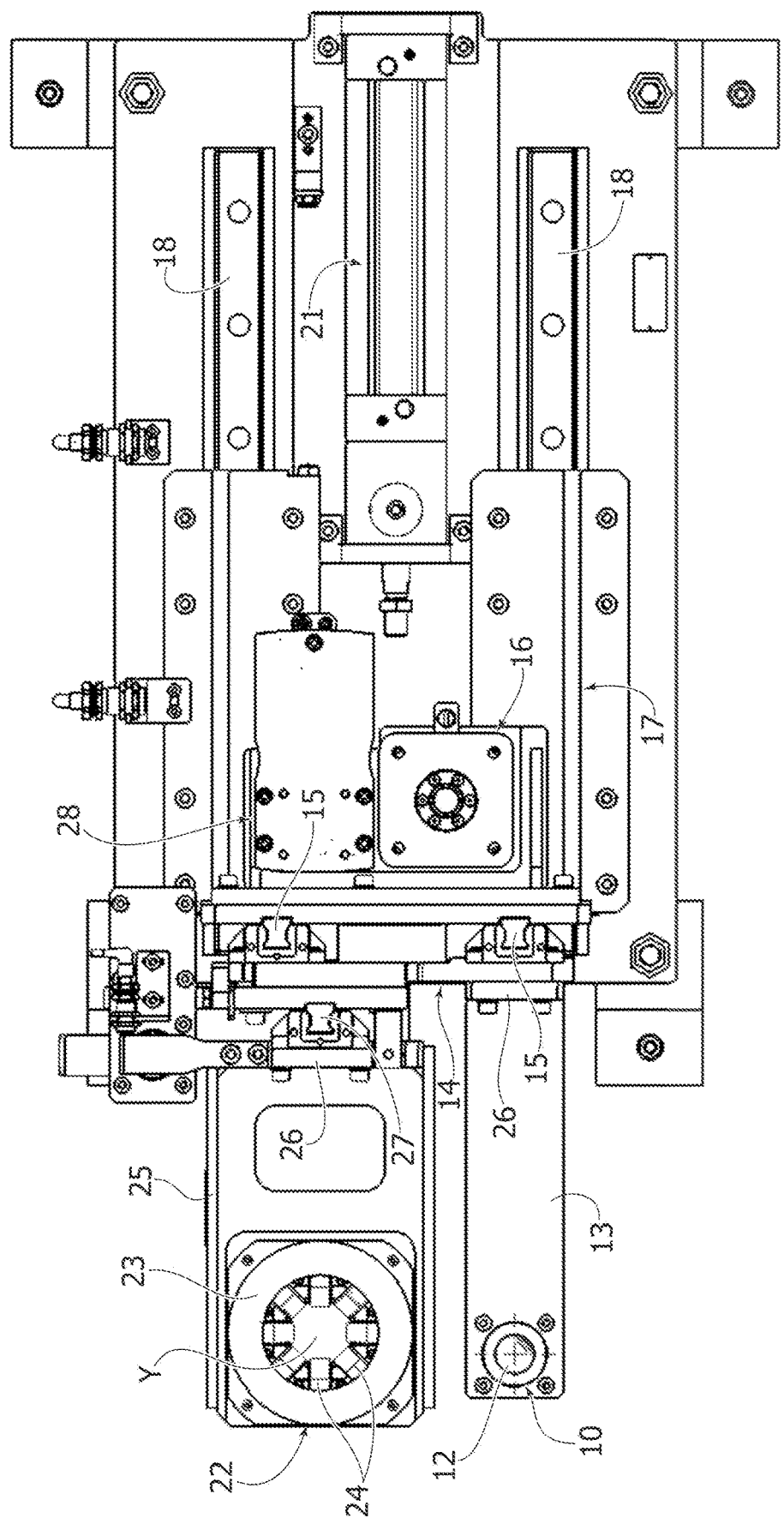
FIG. 8 is a partial plan view of the unit of FIG. 7.

The stationary structures 9 of the type illustrated in FIGS. 7, 8, are also each provided with an auxiliary centering member 22, which is vertically-movable and is intended to cooperate with a respective engagement pin 6 (FIG. 6) projecting from the bottom of the workpiece-holder frame 2.

In the case of the illustrated example, the auxiliary centering member 22 is of a per se known type, including a casing 23 inside of which freely rotatable rollers 24 are mounted, arranged radially around a vertical central axis of the centering member 22, and mounted freely rotatable around respective axes, all arranged in the same horizontal plane orthogonal to the aforesaid central vertical axis. In a way known per se, the rollers 24 define between them a central space Y configured and sized to receive a respective engagement pin 6 following a lifting of the auxiliary centering member 22 with respect to the corresponding pin 6. Each pin 6 has a conical tip that favors the engagement of the centering member 22 around the pin 6, even when the centering member 22 has its central vertical axis that is initially not perfectly aligned with the corresponding vertical axis of the pin 6.

Again with reference to FIGS. 7, 8, in the illustrated example, the centering member 22 is carried by a bracket 25 protruding from a slide 26 slidably mounted on guides 27 which, again in the case of the illustrated example, are carried by the aforesaid slide 14 carrying the ball support 10. Therefore, in this embodiment, activating the actuator or electric motor 28 causes a synchronous vertical movement of the ball support 10 and the auxiliary member 22. When the actuator 28 is deactivated, the vertical movement of the ball support 10 is interrupted, but the vertical movement of the slide 26 carrying the centering member 22 may be controlled by an actuator assembly 100 comprising a pneumatic actuator with a rod-locking device.

Again with reference to the specific example illustrated and, in particular, to FIGS. 1, 3, on one side of the working area A two stationary structures 9 are provided, of the type illustrated in FIGS. 7, 8, each equipped with a ball support 10 and with an auxiliary centering member 22, while on the other side of the working area A (the one illustrated in the lower part of FIG. 3) there are two stationary structures 9 of the type illustrated in FIG. 9, each provided with only the ball support 10. Therefore, in this example, a total of four ball supports 10 are provided, two for each side. In theory, only three ball supports 10, spaced apart from each other, with two supports arranged on opposite sides of the working area A, could be sufficient to support the workpiece-holder frame 2 at a required vertical height Z, if the actual weight of the workpiece-holder frame, of the workpiece and the process forces fall within the virtual triangle whose three vertices are the points of contact between the ball supports 10 and the supports 70.

Again in the case of the illustrated example, two centering members 22 are instead provided, arranged on the same side of the working area A and longitudinally spaced apart from each other.

With reference to FIG. 6, one of the engagement pins 6 protruding from the bottom of the workpiece-holder frame 2 has opposite flattened side surfaces 6A, symmetrical with respect to the axis of the pin itself, so that when said pin 6 engages the respective auxiliary centering member 22, it locates the frame 2 in position with respect to a horizontal direction Y transverse to the longitudinal direction of the frame, acting as an anti-rotation function with respect to the other pin. The other pin 6 protruding from the bottom of the frame 2 (i.e. the pin which is closest to the observer in the view of FIG. 6) instead has a perfectly circular cross-section so that, when it engages the respective centering member 22, it locates the frame 2 in position in the two horizontal directions X, Y orthogonal to each other. The simultaneous engagement of the two pins 6 within the respective auxiliary centering members 22 causes the location in position of the workpiece-holder frame 2 along the two horizontal directions X, Y orthogonal to each other and with respect to rotations of the frame 2 in the horizontal plane. The servo-controlled electric motors 28 and the actuators 100 which—in the illustrated example—constitute the actuator devices for the vertical movement of the ball supports 10 and of the centering members 22, are controlled by an electronic and electropneumatic control unit E (schematically illustrated in FIG. 7) according to a predetermined program, to perform the functions which will now be described below.

Figure 10:
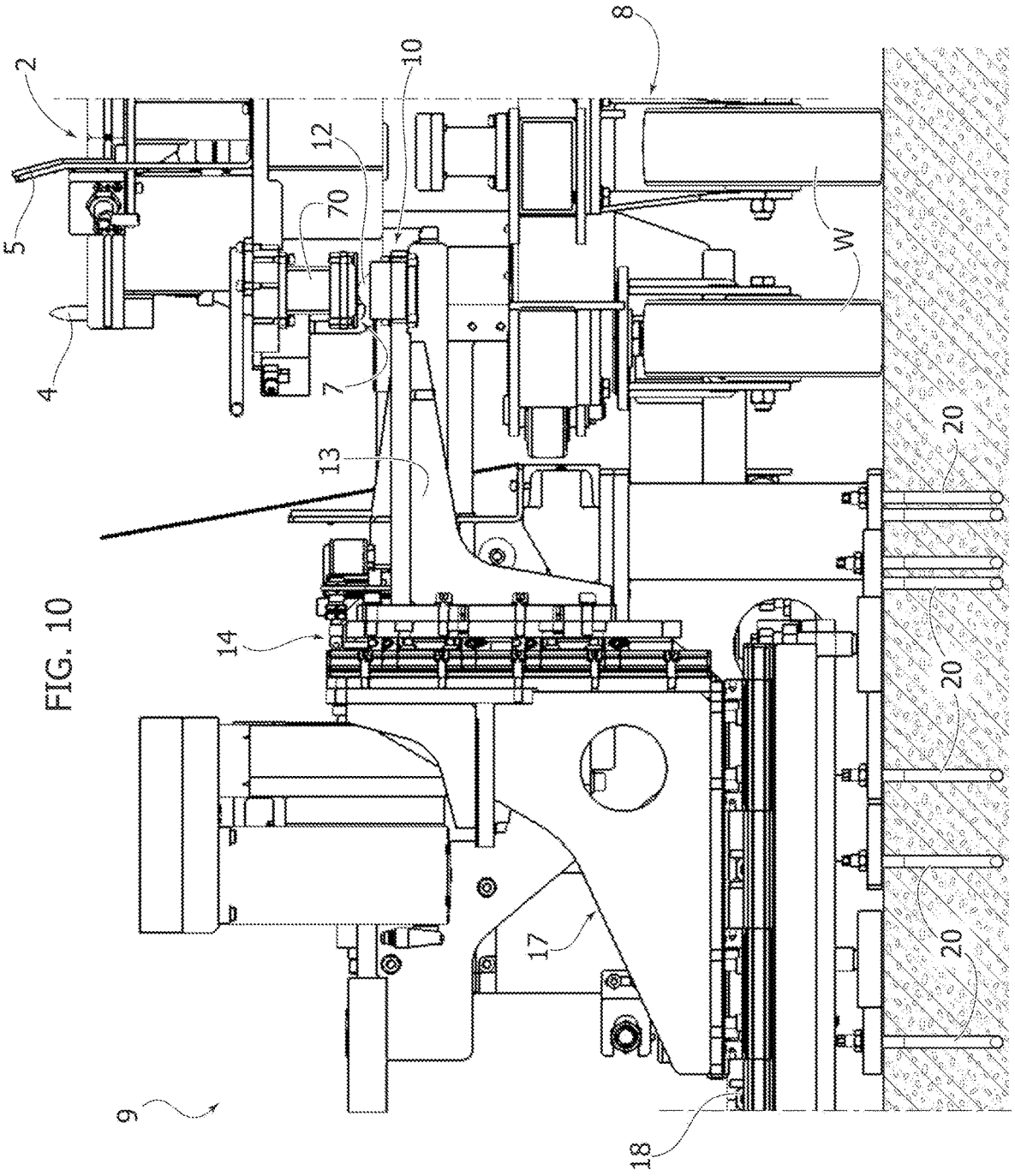
FIGS. 10, 11 are front views showing ball support members arranged on the two sides of the working area of the station in the engagement condition on lower engagement surfaces of the workpiece-holder frame.
Figure 11:
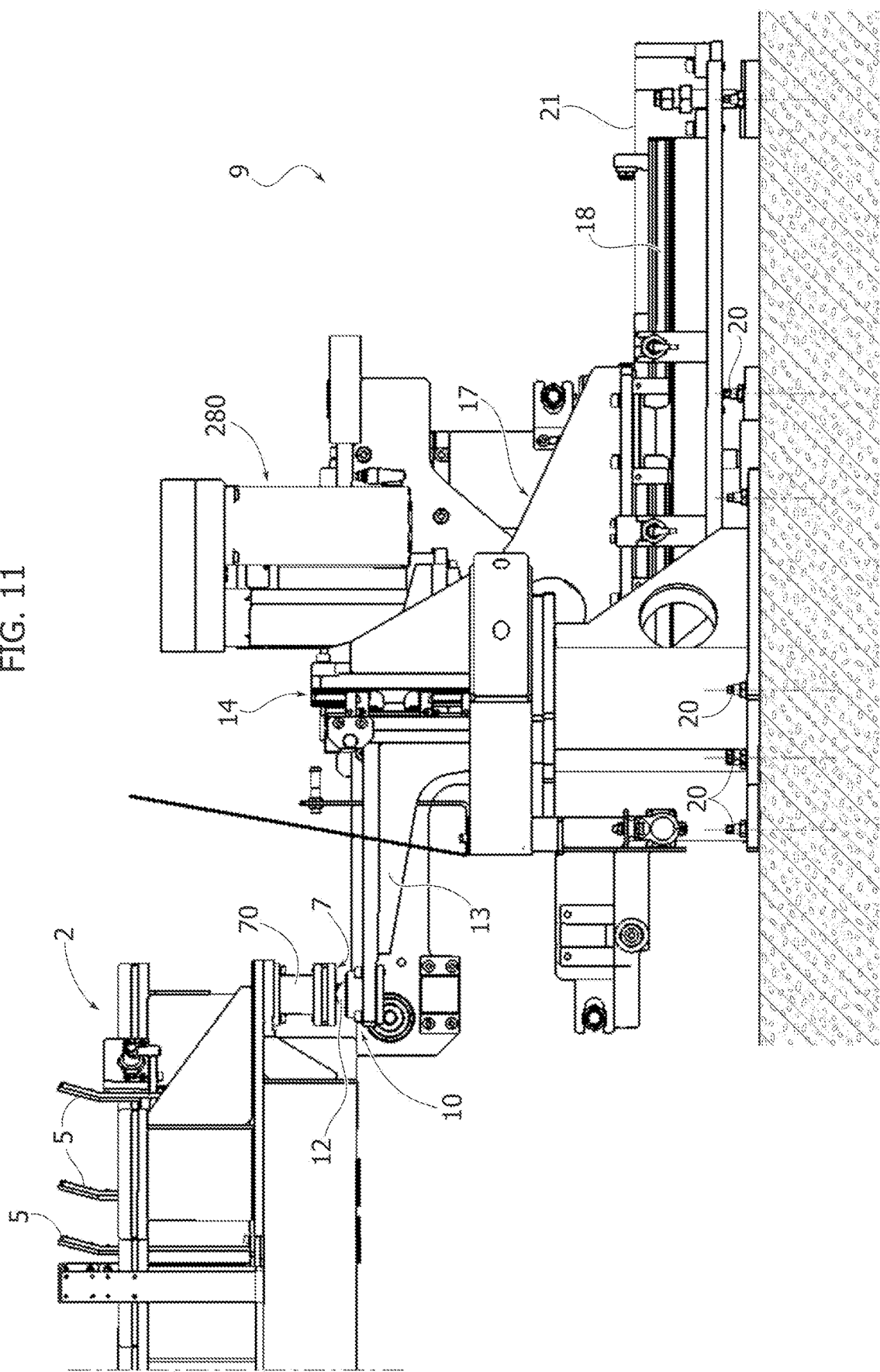

When a carriage 8 is stopped in the working area A, the workpiece-holder frame 2 is lifted and moved away from the carriage 8 by the ball supports 10 and balls 12, which engage the respective lower flat surfaces 7 of the workpiece-holder frame 2 (FIG. 6). The lifting is obtained in that the electronic control unit E activates the electric motors 28 associated with the stationary structures 9 to control the vertical movement of the slides 14. FIGS. 10, 11 illustrate the condition wherein the balls 12 have engaged the respective lower flat surfaces 7 of the workpiece-holder frame 2.

The upward movement of the slides 14 is automatically stopped by the control unit E when it detects that the workpiece-holder frame 2 has reached a predetermined vertical height Z. It should be noted that in this condition, the workpiece-holder frame 2 is completely released from the carriage 8 and is able to float in a horizontal plane above the ball supports 10, due to the free rotation of the balls 12. In this condition, the workpiece holder frame 2 is—in any case—safely held above the balls 12, since, simultaneously with the lifting movement of the ball supports 10, the electronic unit E also commands a vertical lifting movement of the two centering members 22, in such a way that when the workpiece-holder frame 2 reaches the predetermined height Z, the centering members 22 have already begun to engage the conical tips of the respective engagement pins 6. Starting from this condition, while the ball supports 10 remain at the vertical height reached, the centering members 22 continue their upward movement, until they are fully engaged on the respective engagement pins 6. This upward extra-stroke of the centering members 22 on the engagement pins 6 causes the location in position of the workpiece-holder frame 2 along the two horizontal directions X, Y orthogonal to each other and with respect to rotations in the horizontal plane. This centering movement takes place thanks to the possibility of floating in the horizontal plane, which is offered by the ball supports 10 including the balls 12. Once the centering members 22 have reached the vertical position of complete engagement on the pins 6, their movement is naturally stopped. In this condition, the workpiece-holder frame is accurately located in its position in the working area, and the cycle of processing and/or assembling operations can be started on the workpiece carried by the frame 2, both in the case wherein these operations are performed by fully automatic equipment, and in the event that these operations are partly performed manually by operators.

Thanks to the configuration described above of the system according to the invention, the operators can access the working area A. During the cycle of automatic operations, the carriage 8 may remain in position in the working area, or, to perform the manual operations, may be moved to make the working area even more accessible.

As can be seen, another advantage of the system according to the invention is that it can be easily adapted to new applications or on the occasion of introducing a new product into production, or in the case of changes to the path of the production line, and also to a process where it is necessary to alternate automatic or semi-automatic stations that require the entire system of FIG. 3 and purely manual stations for which only the presence of the carriage 8, the workpiece-holder frame 2 and the tractor T is sufficient. The possibility of translating the slide supports 17 of the stationary structures 9 in the transversal direction allows these structures to be easily adapted to different configurations of the workpiece-holder frame 2. Furthermore, the stationary structures 9 may be easily disassembled and reassembled in different positions along the longitudinal direction of the line, again to adapt to different configurations of the workpiece-holder frame 2. Of course, the possibility of envisaging that each structure 9 is mounted on a slide that is movable in the longitudinal direction of the line is not excluded at all, in order to also make the adjustment of the position of the structures 9 in the longitudinal direction of the line automatic.

Once the cycle of operations on the workpiece carried by the frame 2 has ended, the frame 2 can be lowered again onto the carriage 8 by controlling a lowering movement of the ball supports 10 and of the centering members 22. Once the frame 2 has been deposited on top of the carriage 8, the carriage can be moved to carry the frame 2, with the workpiece carried above it, out of the working area A, to be sent to subsequent operations in the production process.

Figure 14:
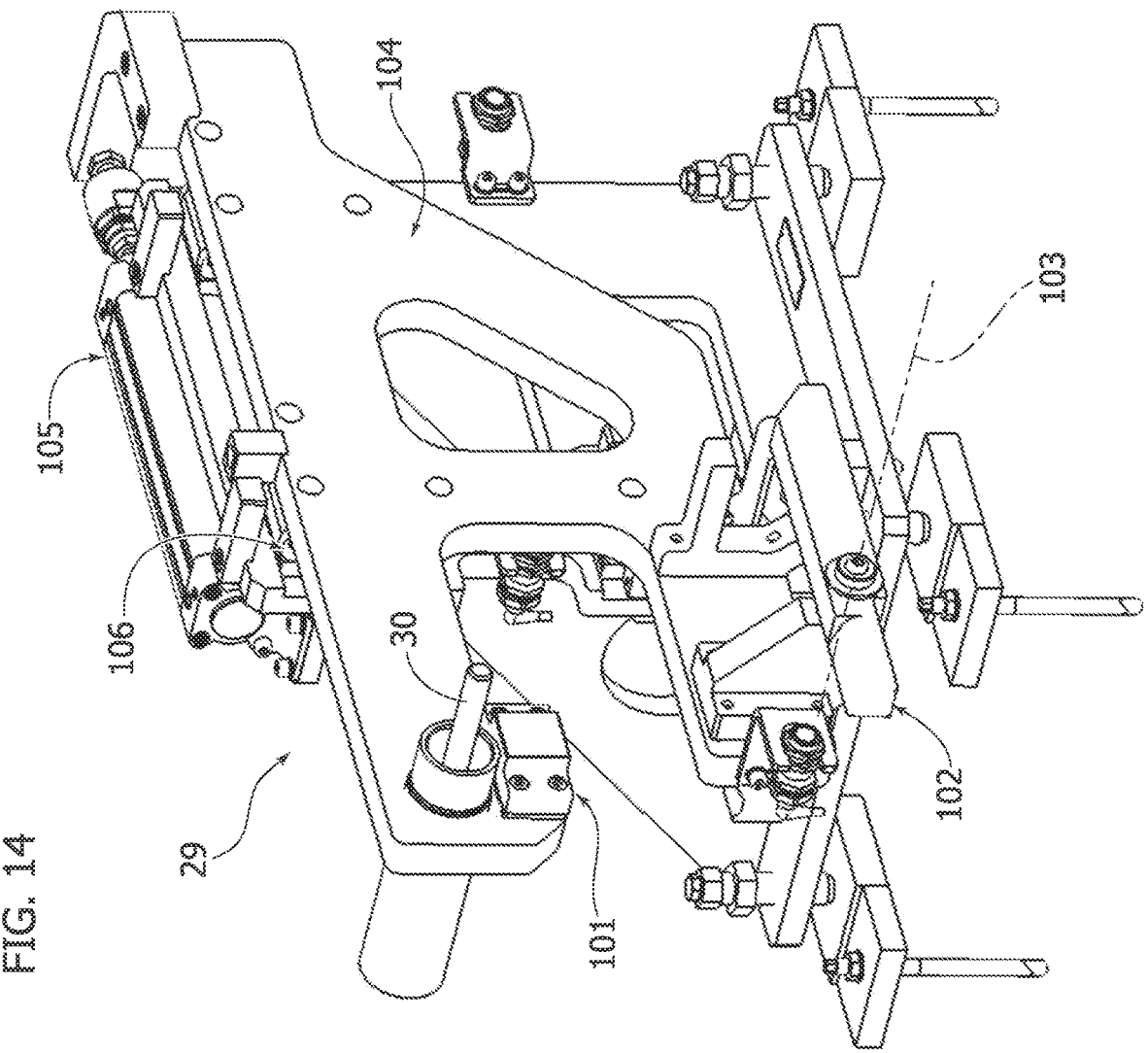
FIG. 14 is a perspective view of an additional stationary unit arranged on one side of the working area of the station of FIG. 1 carrying a stop device for stopping a carriage in a predetermined position in the working area of the processing station.

Preferably, in the working area A, there is also a stop device 29 provided with a cushioned stop member 30 intended to cooperate with the carriage 8 or with the workpiece-holder frame 2 carried on the carriage 8 to give a reference of the correct position in the working area A along the longitudinal direction. In particular, the stop block or pad 101 (FIG. 14) defines a fixed stop position of the carriage or of the workpiece-holder frame; to obviate any retrograde movement of the carriage, there is an anti-return device consisting of a beveled movable bar 102, which is free to rotate around an axis 103. This bar 102 can be pulled down from the carriage only in the advancing direction of the carriage itself, but by returning the bar to its rest position due to its weight or a return spring, it prevents the retrograde motion of the carriage.

The bar 102 interacts with the carriage, engaging a lower portion 81 of the carriage (FIG. 4).

The anti-return device (i.e., bar 102), the stop pad 101 and the cushioned stop member 30 are all mounted on a slide 104 which slides on guides 106 and is operated by a pneumatic actuator 105.

Before the carriage reaches the stop position, the stop device 29 is advanced towards the center of the translation axis of the carriage into the working area in order to intercept the carriage in its transit. After the carriage has stopped, to allow the carriage to leave the working area, the stop device 29 moves back away from the center of the carriage translation axis, leaving it free to exit the working area.

Of course, without prejudice to the principle of the invention, the details of construction and the embodiments may vary widely with respect to those described and illustrated, without departing from the scope of the present invention. In particular, the invention includes a system such as the one indicated in the attached claim 1, wherein any other known type of transport device is provided instead of a carriage.

The invention claimed is:

1. A system for locating a workpiece supporting frame in position in a processing or assembling station of a production plant, comprising:
    the processing or assembling station defining a working area; stationary support structures on both sides of the working area;
    a carriage, configured to carry a workpiece-holder frame along a line inside the working area, the workpiece-holder frame is
    configured to support a workpiece in a predetermined position with respect to the workpiece-holder frame,
    wherein said stationary support structures futher comprise at least three vertically-movable ball supports spaced apart from each other and positioned and configured to engage and lift the workpiece-holder frame when the carriage is stationary in the working area, so as to move the workpiece-holder frame away from the carriage and position the workpiece-holder frame at a predetermined vertical height,
    wherein two of the at least three ball supports are arranged on opposite sides of the working area and each ball support including a ball which is freely rotatable in any direction around its respective center,
    wherein the workpiece-holder frame has further comprises a plurality of flat lower engagement surfaces, positioned and configured to be respectively engaged by said ball supports, in such a way that when the workpiece-holder frame is raised to said predeterimined vertical height, the workpiece-holder frame can float in any horizontal direction above the balls of said ball supports, and
    wherein at least two of said stationary support structures further comprise an auxiliary centering member which are vertically movable and spaced apart from each other, said auxiliary centering members being configured to cooperate with engagement elements projecting downwardly from the workpiece-holder frame, in such a way as to locate in position the workpiece-holder frame along two horizontal directions (X, Y) orthogonal to each other and with respect to rotations in a horizontal plane;
    said system further comprising:
    actuator devices configured to control the vertical movement of said ball supports and of said auxiliary centering members independently of each other; and
    an electronic controller programmed and configured to control said actuator devices in such a way that when the carriage has brought the workpiece-holder frame into the working area, the ball supports are raised, engaging the workpiece-holder frame and lifting it up to the predetermined vertical height, while the auxiliary centering members are simultaneously raised, so as to only partially engage the cooperating engagement elements when the workpiece-holder frame reaches the predetermined vertical height, said auxiliary centering members then continuing their upward movement, until fully engaging the corresponding engagement elements of the workpiece-holder frame, so as to locate the workpiece-holder frame in position in the said two horizontal directions (X, Y) and with respect to rotations in the horizontal plane, wherein the workpiece-holder frame can float in any horizontal direction above the balls of said ball supports.

2. The system according to claim 1, wherein said engagement elements of the workpiece-holder frame comprise pins having a circular cross-section and a conical tip, projecting downwards from supports of the workpiece-holder frame located on the same side of the workpiece-holder frame and adjacent respectively to two opposite ends of the workpiece-holder frame, and
    wherein two of the auxilliary centering members cooperating with respective of said pins are carried by two of the stationary structures arranged on the same side of the working area and each defining a central space configured to receive the respective pin.

3. The system according to claim 1, wherein the flat lower engagement surfaces of the workpiece-holder frame lie in a first single horizontal plane and that the balls of said ball supports at their tops are all tangent to a second single horizontal plane, the second single horizontal plane is parallel to the first single horizontal plane, wherein
    said balls simultaneously engage said flat lower engagement surfaces when the workpiece-holder frame is raised.

4. A system according to claim 3, wherein said flat lower engagement surfaces of the workpiece-holder frame are spaced apart from each other at distances and, and the tops of said balls of said ball supports are spaced apart from each other by distances corresponding to the distances between the flat lower engagement surfaces of the workpiece-holder frame,
    wherein said balls simultaneously engage the corresponding flat lower engagement surfaces when the workpiece-holder frame is raised.

5. The system according to claim 3, wherein said electronic controller is configured to control said actuator devices associated with said stationary structures simultaneously, so as to move the workpiece-holder frame vertically while maintaining a horizontal orientation of the workpiece-holder frame.

6. The system according to claim 2, wherein one of said pins further comprises two opposite flattened sides, wherein said one pin cooperates with the respective auxiliary centering member so as to locate the workpiece-holder frame in position with respect to the horizontal direction (Y) transverse with respect to a longitudinal direction of the workpiece-holder frame, while the other pin cooperates with the respective auxilliary centering member in such a way as to locate the workpiece-holder frame in position with respect to both horizontal directions (X, Y) orthogonal to each other, and with respect to rotations of the workpiece-holder frame in the horizontal plane.

7. The system according to claim 2, wherein each of said auxilliary centering members comprises a set of freely rotatable rollers arranged radially around a central vertical axis, the rollers having respective rotational axes lying in a plane orthogonal to said central vertical axis.

8. The system according to claim 1, wherein each of said ball supports and each of said auxilliary centering members is connected to a respective bracket projecting from a vertically movable slide, the vertically movable slide is driven by a servo-controlled electric motor, said slide being slidably mounted on guides connected to a slide support, the slide support is slidably mounted, in a horizontal direction transverse to the longitudinal direction of the line, on guides of a base plate of said stationary structure.

9. The system according to claim 8, wherein in that the bracket connected to the auxiliary centering member is slidably mounted vertically on a guide connected to the vertically-movable slide, which is connected to the respective ball support, wherein on actuation of the electric motor which controls the vertical movement of the vertically movable slide connected to the ball support also causes a simultaneous vertical movement of the auxiliary centering member associated therewith, wherein when the electric motor of the vertically movable slide connected to the ball support is stopped, an actuator configured to control the vertical movement of the vertically movable slide connected to the auxiliary centering member can be activated, so as to continue to move the auxiliary centering member vertically after the ball support has been stopped at the predetermined vertical height.

10. The system according to claim 1, wherein in that said carriage comprises a manual traction carriage, a towable carriage with a motorized tractor, a motorized carriage, an AGV, or an AMR.

11. The system according to claim 4, wherein said electronic controller is configured to control said actuator devices associated with said stationary structures simultaneously, so as to move the workpiece-holder frame vertically while maintaining a horizontal orientation of the workpiece-holder frame.

12. A method for locating a workpiece-holder frame in position in a processing or assembling station of a production plant, wherein:

the processing or assembling station comprises a working area and stationary support structures on both sides of the working area;

a workpiece-holder frame is carried along a line inside the working area, by transporting the workpiece-holder frame on a carriage, said workpiece-holder frame is configured to support a workpiece in a predetermined position with respect to the workpiece-holder frame, wherein the stationary support structures on the both sides of the working area comprise at least three vertically-movable ball supports, spaced apart from each other and positioned and configured to engage and lift the workpiece-holder frame carried by said carriage, when the carriage is stationary in the working area, in such a way as to move the workpiece-holder frame away from the carriage and position the workpiece-holder frame at a predetermined vertical height, wherein two of the at least three ball supports are arranged on opposite sides of the working area and each including a ball which is freely rotatable in any direction around its respective center, wherein the workpiece-holder frame has further comprises a plurality of flat lower engagement surfaces, positioned and configured to be respectively engaged by said ball supports, in such a way that when the workpiece-holder frame is raised to said predetermined vertical height, the workpiece-holder frame can float in any horizontal direction above the balls of said ball supports, and wherein at least two of said stationary support structures further comprise respective auxiliary centering members, which are vertically movable and spaced apart from each other, the auxiliary centering members being configured to cooperate with engagement elements projecting downwardly from the workpiece-holder frame, in such a way as to locate the workpiece-holder frame in position along two horizontal directions (X, Y) orthogonal to each other and with respect to rotations in a horizontal plane, and wherein:

when the carriage has brought a workpiece-holder frame into the working area, the ball supports are raised, engaging the workpiece-holder frame and lifting it up to the predetermined vertical height, while the auxiliary centering members are simultaneously raised, so as to partially engage the cooperating engagement elements when the workpiece-holder frame reaches the predetermined vertical height, said auxiliary centering members then continuing their upward movement, until fully engaging the corresponding engagement elements of the workpiece-holder frame, so as to locate the workpiece-holder frame in position in the two horizontal directions (X, Y) and with a predetermined orientation with respect to rotations in the horizontal plane, wherein the workpiece-holder frame can float in any horizontal direction above the balls of said ball supports until the auxiliary centering members have reached a vertical position of complete engagement with the cooperating engagement elements.

* * * * *